(12) United States Patent
Ananth

(10) Patent No.: US 11,477,787 B2
(45) Date of Patent: Oct. 18, 2022

(54) DYNAMIC SPECTRUM SHARING BETWEEN COVERAGE TYPES

(71) Applicant: Google LLC, Mountain View, CA (US)

(72) Inventor: Sharath Ananth, Cupertino, CA (US)

(73) Assignee: AALYRIA TECHNOLOGIES, INC., Livermore, CA (US)

(*) Notice: Subject to any disclaimer, the term of this patent is extended or adjusted under 35 U.S.C. 154(b) by 2 days.

(21) Appl. No.: 17/018,542

(22) Filed: Sep. 11, 2020

(65) Prior Publication Data
US 2021/0084649 A1 Mar. 18, 2021

Related U.S. Application Data (60) Provisional application No. 62/900,090, filed on Sep. 13, 2019.

(51) Int. Cl.
*H04W 72/04* (2009.01)
*H04W 24/02* (2009.01)
(Continued)

(52) U.S. Cl.
CPC ....... *H04W 72/0453* (2013.01); *H04W 16/14* (2013.01); *H04W 24/02* (2013.01); *H04W 72/1205* (2013.01)

(58) Field of Classification Search
CPC . H04W 72/0453; H04W 16/14; H04W 24/02; H04W 72/1205
See application file for complete search history.

(56) References Cited

U.S. PATENT DOCUMENTS

2008/0287124 A1 11/2008 Karabinis
2012/0122449 A1 5/2012 Monte et al.
(Continued)

FOREIGN PATENT DOCUMENTS

WO WO-2013120517 A1 * 8/2013 ............... H04L 5/14
WO WO-2016184040 A1 * 11/2016 ............ H04W 36/14
(Continued)

OTHER PUBLICATIONS

International Search Report and Written Opinion for Application No. PCT/US20/50667 dated Dec. 21, 2020.

*Primary Examiner* — Joshua L Schwartz
(74) *Attorney, Agent, or Firm* — Platinum Intellectual Property LLP (57) ABSTRACT

Assigning resources for transmitting signals to a user equipment includes receiving, at a first node having a first coverage area, an indication of an overlapping coverage area from a second node when the second node is a non-terrestrial node having a second coverage area that overlaps with the first coverage area. Request for resources are received from a user equipment in the first coverage area, and resources assignments to the user equipment are determined based on the first message and the received request. The resource assignments include a first resource assignment for communication with the first node and a second resource assignment for communication with the second node. The resource assignments are transmitted in a second message to the user equipment, which then communicates with the first node using the first resource assignment and to communication with the second node using the second resource assignment.

20 Claims, 9 Drawing Sheets

(51) Int. Cl.
*H04W 72/12* (2009.01)
*H04W 16/14* (2009.01)

(56) References Cited

U.S. PATENT DOCUMENTS

| | | |
|---|---|---|
| 2016/0037434 A1 | 2/2016 | Gopal |
| 2017/0202025 A1 | 7/2017 | Ouchi et al. |
| 2018/0279303 A1 | 9/2018 | Sun et al. |
| 2019/0297662 A1 | 9/2019 | Palat et al. |
| 2019/0305915 A1 | 10/2019 | Zhu et al. |
| 2020/0059954 A1 | 2/2020 | Wu et al. |

FOREIGN PATENT DOCUMENTS

| | | | | |
|---|---|---|---|---|
| WO | WO-2017016588 A1 | * | 2/2017 | ........... H04L 5/0023 |
| WO | 2018121208 A1 | | 7/2018 | |

* cited by examiner

DYNAMIC SPECTRUM SHARING BETWEEN COVERAGE TYPES

CROSS REFERENCE TO RELATED APPLICATIONS

The present application claims the benefit of U.S. Patent Application No. 62/900,090, filed Sep. 13, 2019, the entire disclosure of which are incorporated by reference herein.

BACKGROUND

Information can be transmitted over directional point-to-point networks or point-to-multipoint networks, such as aerospace and other mobile networks. In such networks, links can be formed between pairs of nodes by aiming transceivers of each node pair towards each other. Links can also be formed by steering the transceivers of a network node either toward a discrete user terminal or node or toward some discrete point to cover a general geographic area. In some implementations, nodes may include non-geostationary satellite orbit (NGSO) satellites or other high-altitude platforms (HAPs) that are in motion relative to the Earth.

BRIEF SUMMARY

The technology described herein provides for methods, systems, or mediums for implementing 5G NR using non-terrestrial nodes, such as high-altitude platforms. The methods, systems, or mediums allow for 5G-enabled nodes to coexist with other nodes providing other types of coverage. In addition, the methods and systems allow for networks to utilize resources made available through 5G NR, as well as other types of coverage.

Aspects of the disclosure provide for a method of assigning resources for transmitting signals to a user equipment. The method includes receiving, by one or more processors of a first node having a first coverage area, a first message from a second node when the second node is a non-terrestrial node having a second coverage area that overlaps with the first coverage area, the first message including an indication of an overlapping coverage area; receiving, by the one or more processors, requests for resources from a user equipment in the first coverage area; determining, by the one or more processors, resource assignments to the user equipment based on the first message and the received request, the resource assignments including a first resource assignment for communication with the first node and a second resource assignment for communication with the second node; and transmitting, by the one or more processors, the resource assignments to the user equipment in a second message to cause the user equipment to communicate with the first node using the first resource assignment and to communication with the second node using the second resource assignment.

In one example, the requests for resources from the user equipment includes a request to block a set of resources from use with the first node. In another example, the determining of the resource assignments includes determining that the user equipment is in the first coverage area of the first node and the second coverage area of the second node. In a further example, the determining of the resource assignments includes using Semi-Persistent Scheduling. In yet another example, the first resource assignment is a first frequency band, and the second resource assignment is a second frequency band different from the first frequency band. In a still further example, the first resource assignment is a first time frame in a period, and the second resource assignment is a second time frame in the period different from the first time frame. In another example, the method also includes sending, by the one or more processors, one or more signals based on the first resource assignment.

Other aspects of the disclosure provide for a system for assigning resources for transmitting signals to a user equipment. The system includes one or more transceivers, and one or more processors of a first node in communication with the one or more transceivers. The one or more processors are configured to receive, using the one or more transceivers, a first message from a second node when the second node is a non-terrestrial node having a second coverage area that overlaps with a first coverage area of the first node, the first message including an indication of an overlapping coverage area; receive, using the one or more transceivers, requests for resources from a user equipment in the first coverage area; determine resource assignments to the user equipment based on the first message and the received request, the resource assignments including a first resource assignment for communication with the first node and a second resource assignment for communication with the second node; and transmit, using the one or more transceivers, the resource assignments to the user equipment in a second message to cause the user equipment to communicate with the first node using the first resource assignment and to communication with the second node using the second resource assignment.

In one example, the requests for resources from the user equipment includes a request to block a set of resources from use with the first node. In another example, the one or more processors are configured to determine the resource assignments based on whether the user equipment is in the first coverage area of the first node and the second coverage area of the second node. In a further example, the one or more processors are configured to determine of the resource assignments using Semi-Persistent Scheduling. In yet another example, the first resource assignment is a first frequency band, and the second resource assignment is a second frequency band different from the first frequency band. In a still further example, the first resource assignment is a first time frame in a period, and the second resource assignment is a second time frame in the period different from the first time frame. In another example, the one or more processors are further configured to send, using the one or more transceivers, one or more signals based on the first resource assignment. In a further example, the system also includes a terrestrial tower.

Further aspects of the disclosure provide for a non-transitory, computer-readable medium including instructions that, when executed by one or more processors, cause the one or more processors to perform a method. The method includes receiving, at a first node having a first coverage area, a first message from a second node when the second node is a non-terrestrial node having a second coverage area that overlaps with the first coverage area, the first message including an indication of an overlapping coverage area; receiving requests for resources from a user equipment in the first coverage area; determining resource assignments to the user equipment based on the first message and the received request, the resource assignments including a first resource assignment for communication with the first node and a second resource assignment for communication with the second node; and transmitting the resource assignments to the user equipment in a second message to cause the user equipment to communicate with the first node using the first resource assignment and to communication with the second node using the second resource assignment.

In one example, the requests for resources from the user equipment includes a request to block a set of resources from use with the first node. In another example, the determining of the resource assignments includes determining that the user equipment is in the first coverage area of the first node and the second coverage area of the second node. In a further example, the first resource assignment is a first frequency band, and the second resource assignment is a second frequency band different from the first frequency band. In yet another example, the first resource assignment is a first time frame in a period, and the second resource assignment is a second time frame in the period different from the first time frame.

DETAILED DESCRIPTION

Overview

The technology relates to implementing 5G NR using non-terrestrial nodes, such as high-altitude platforms. In particular, the 5G-enabled non-terrestrial nodes may be required to coexist with other nodes providing other types of coverage, such as 4G LTE. In areas where there is 5G coverage as well as another type of network coverage is available, there is a need to coordinate between the different types of signals to provide coverage to user equipment (UE) in these areas. There are also new opportunities made available by the presence of multiple types of signals that may be taken advantage of in order to increase coverage or capacity of the overall network.

For example, a network may include a plurality of terrestrial nodes, such as towers, located in a geographic area. The network may be configured to provide 4G LTE coverage to the geographic area. In some implementations, the network may additionally be configured to provide 5G NR coverage to the geographic area or another type of coverage. One or more non-terrestrial nodes may be included in the network temporarily or permanently. For example, a high-altitude balloon may be added as a node of the network when the high-altitude balloon is in range of one of the terrestrial nodes of the network. The high-altitude balloon may be configured to provide large area coverage to the geographic area, such that a signal beam transmitted from the high-altitude balloon may cover an area including multiple terrestrial nodes in the geographic area. The high-altitude balloon may also be configured to transmit narrower signal beams focused on a smaller area than the large area coverage. The one or more non-terrestrial nodes may be equipped to provide 5G NR coverage. In some examples, the one or more non-terrestrial nodes are also equipped to provide 4G LTE coverage and/or another type of coverage. Alternatively, the one or more non-terrestrial nodes of the network equipped for 5G NR coverage may comprise a second, separate network to the networking including the plurality of terrestrial nodes.

In one aspect of the technology, resource allocation for 5G coverage in an area may be defined based on the spectrum that is already implemented in the area. In another aspect, spectrum may be assigned dynamically for 5G coverage by strategically requesting or blocking resources or by tracking what resources become available in scheduling. In a further aspect, locating UE may be accomplished using a 5G beam in coordination with a wide coverage beam. In yet another aspect, performing handovers between a first node and a second node may include a protocol for updating or disassociating a physical cell identifier of a first node prior to connecting with the second node, which may have the same identifier. In an additional aspect, the backhaul capacity may be increased for non-terrestrial nodes by implementing distributed backhaul from a non-terrestrial node to a plurality of donor nodes of the network. These implementations will be discussed in further detail below.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Example Systems and Network

Figure 1:
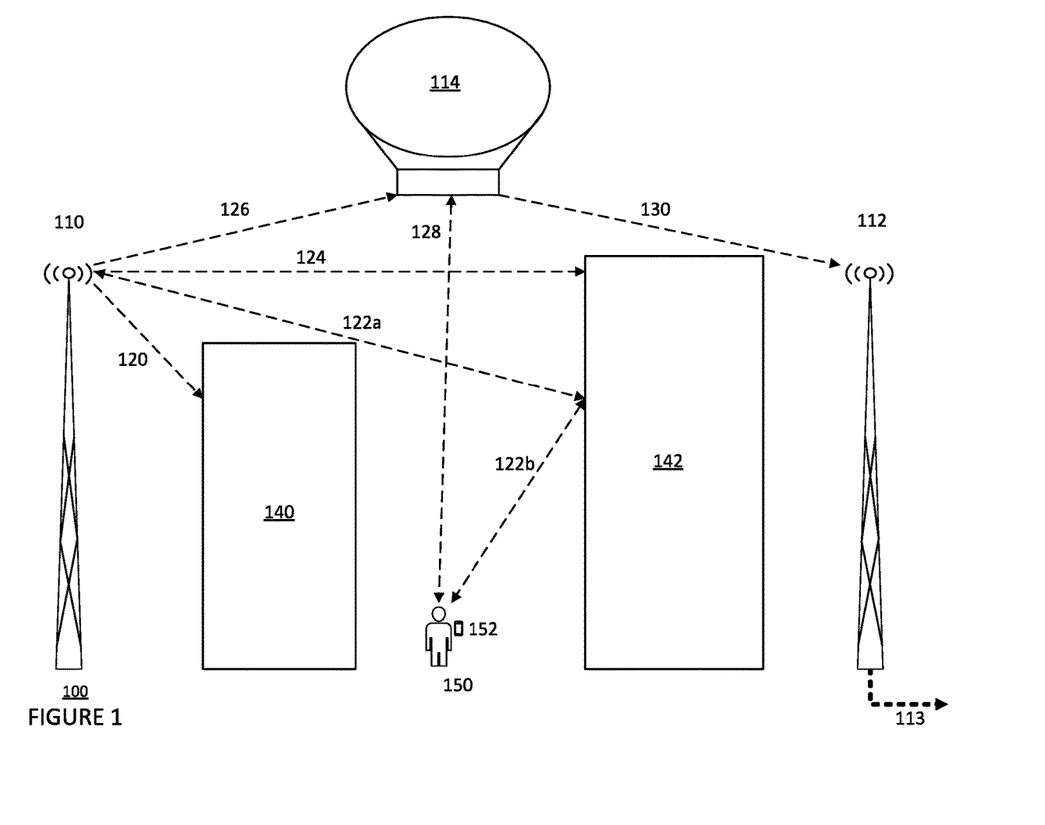
FIG. 1 is a pictorial diagram of a portion of an example network in accordance with aspects of the disclosure.

FIG. 1 is a pictorial diagram of an example system 100 of network nodes in a network. The network may include nodes mounted on various land- and air-based devices, some of which may change position with respect to other nodes in the network over time. For example, as shown in FIG. 1, the network includes, as nodes, a first terrestrial tower 110 and a second terrestrial tower 112. The network also includes as a node a high-altitude platform 114. As shown, HAP 114 is a balloon. In other embodiments, the HAP may be a blimp, an airplane, an unmanned aerial vehicle (UAV) such as a drone, a satellite, or another platform capable of low Earth orbit.

Nodes in the network may be equipped to transmit and receive mmWave signals or other very high frequency signals. Additionally or alternatively, nodes in the network may be equipped to transmit and receive other radio-frequency signals, optical signals, or other communication signal capable of travelling through free space. Arrows shown projecting from nodes represent possible paths 120, 122a, 122b, 124, 126, 128, 130 for a transmitted communication signal. As shown in FIG. 1, some possible paths may be blocked by buildings, such as buildings 140, 142. For example, a signal following path 120 from node 110 may be angled below the horizon and be blocked by building 140. A signal following path 122a from node 110 may be angled above path 120, avoiding building 140, but then may contact building 142. The signal following path 122a may reflect off building 142 and follow path 122b towards the ground location of a user 150, carrying a client device 152. A signal following path 124 from node 110 may be angled towards or above the horizon, nearly parallel to the ground, passing over building 140, but then may be blocked by building 142. A signal following path 126 from node 110 may be angled above the horizon and reach node 114. A signal following path 128 from node 114 directed to the ground location of user 150. A signal following path 130 from node 114 may be angled below the horizon, pass over building 142, and reach node 112.

Also shown in FIG. 1, a signal may be transmitted from the client device 152 of the user 150 back towards one or more nodes of the network. For example, a signal from the client device 152 may be transmitted back along paths 122b and 122a towards node 110. Another signal from the client device 152 may be transmitted back along path 128 towards node 114. In addition, multiple users or multiple client devices may form bi-directional access links with a given node of the network at a given point in time, in addition to the user 150 and the client device 152 shown in FIG. 1.

The network nodes as shown in FIG. 1 is illustrative only, and the network may include additional or different nodes. For example, in some implementations, the network may include additional HAPs and/or additional terrestrial towers. When the network includes at least one low Earth orbit or high Earth orbit satellite as well as one other type of HAP, the network may be defined as a hybrid HAP/satellite network.

Figure 2:
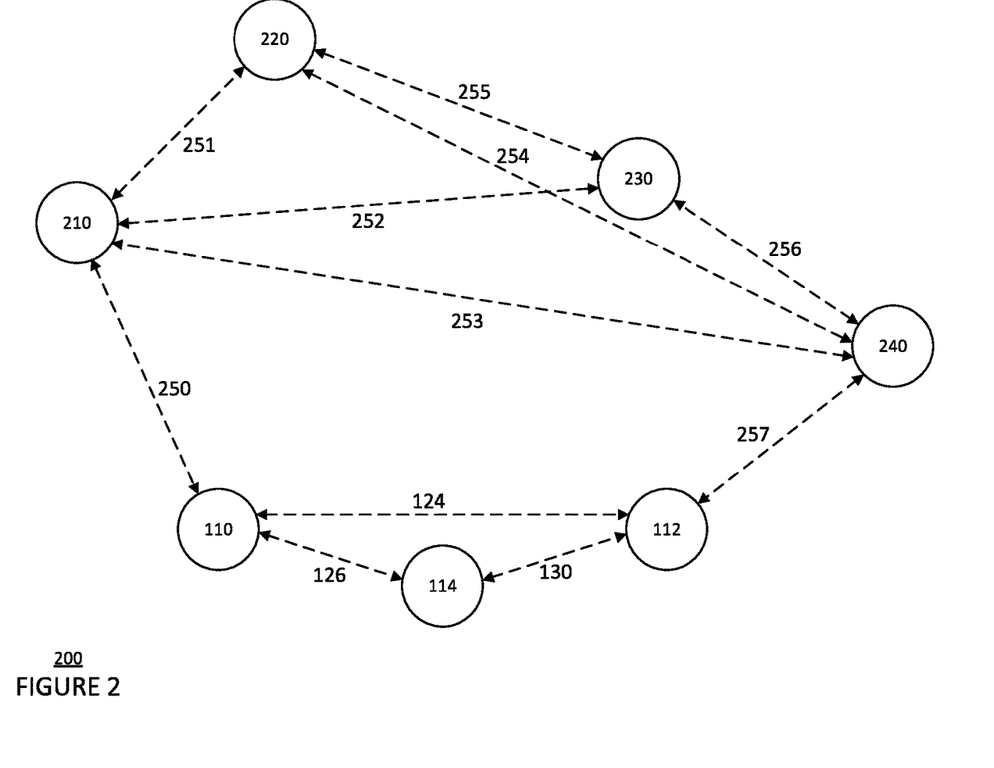
FIG. 2 is a diagram of an example network in accordance with aspects of the disclosure.

For example, as shown in FIG. 2, the network 200 that includes the system 100 may also include as nodes additional terrestrial towers 210, 220, 230, and 240. Arrows shown between a pair of nodes represent possible communication paths between the nodes. In addition to paths 124, 126, and 130 corresponding to the paths shown in FIG. 1, paths 250-257 are shown between the nodes. The network 200 as shown in FIG. 2 is illustrative only, and in some implementations the network 200 may include additional or different nodes. The status information received from the nodes of the network may include the location information of HAP 114 or weather conditions at locations of terrestrial towers 110, 112, 210, 220, 230, and 240 at a current time or a future time. The location information of HAP 114 may include a projected trajectory or set location, such as a future location at the future time that is in signal range of the terrestrial towers 110, 112.

In some implementations, the network may serve as an access network for client devices such as cellular phones, laptop computers, desktop computers, wearable devices, or tablet computers. For example, nodes 110, 112, 114 may connect to the datacenters via wireless, fiber, or cable backbone network links or transit networks operated by third parties. The nodes 110, 112, 114 may provide wireless access for the users, and may forward user requests to the datacenters and return responses to the users via the backbone network links.

In particular, the first terrestrial tower 110, the second terrestrial tower 112, and the HAP 114 may include wireless transceivers configured to operate in a cellular or other mobile network, such as 5G NR (new radio) networks or LTE networks. The nodes 110, 112, 114 may operate as gNodeB stations, eNodeB stations, or other wireless access points, such as WiMAX or UMTS access points. One or more terrestrial towers in the network may include an optical fiber or other link connecting the one or more terrestrial towers to another terrestrial tower or datacenter. For example, the second terrestrial tower 112 may include fiber 113, shown by a dotted arrow, that connects to another terrestrial tower (not shown). As shown in FIG. 1, user 150 carrying a client device 152 may be configured to communicate with one or more of the nodes in the network. The network also may be connected to a larger network, such as the Internet, and may be configured to provide a client device with access to resources stored on or provided through the larger computer network.

Figure 3:
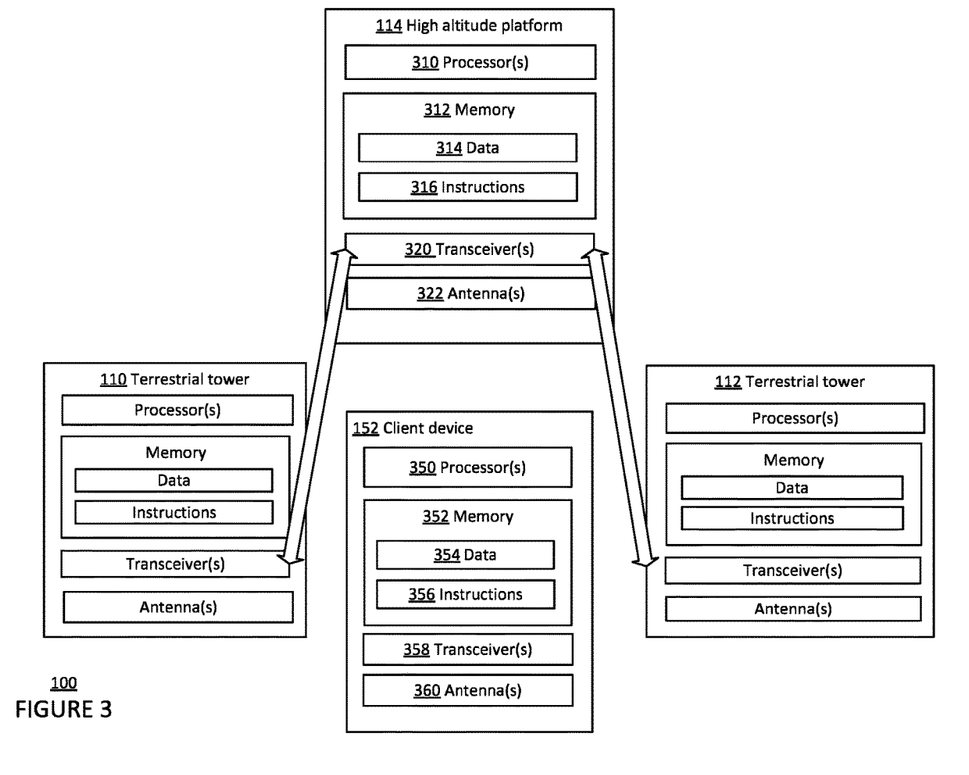
FIG. 3 is a functional diagram of the portion of the network shown in FIG. 1 in accordance with aspects of the disclosure.

As shown in FIG. 3, each node, such as first terrestrial tower 110, second terrestrial tower 112, and HAP 114, may include one or more transceivers configured to transmit and receive communication signals and create one or more communication links with another node in the network. Referring to HAP 114 as an example, each of the nodes, may include one or more processors 310, memory 312, one or more transceivers 320, and one or more antennas 322. While only terrestrial towers 110, 112 and HAP 114 are shown, other terrestrial towers and HAPs in the network may have the same or as similar configurations.

The one or more processors 310 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors 210 may be configured to operate according to a given protocol architecture for a mobile network, such as 5G NR architecture or LTE radio protocol architecture. Although FIG. 3 functionally illustrates the one or more processors 310 and memory 312 as being within the same block, it will be understood that the one or more processors 310 and memory 312 may actually comprise multiple processors and memories that may or may not be stored within the same physical housing. Accordingly, references to a processor or computer will be understood to include references to a collection of processors or computers or memories that may or may not operate in parallel.

Memory 312 stores information accessible by the one or more processors 310, including data 314, and instructions 316, that may be executed by the one or more processors 310. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 314 and instructions 316 are stored on different types of media. In the memory of each node, such as memory 312 of HAP 114, a forwarding information base or forwarding table may be stored that indicate how signals received at each node should be forwarded, or transmitted. For example, the forwarding table stored in memory 312 may indicate that a signal received from ground station 110 should be forwarded to HAP 114.

Data 314 may be retrieved, stored or modified by the one or more processors 310 in accordance with the instructions 316. For instance, although the system and method are not limited by any particular data structure, the data 314 may be stored in computer registers, in a relational database as a table having a plurality of different fields and records, XML documents or flat files. The data 314 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 314 may comprise any information sufficient to identify the relevant information, such as numbers, descriptive text, proprietary codes, references to data stored in other areas of the same memory or different memories (including other network locations) or information that is used by a function to calculate the relevant data.

The instructions 316 may be any set of instructions to be executed directly (such as machine code) or indirectly (such as scripts) by the one or more processors 310. For example, the instructions 316 may include the given protocol architecture for the mobile network of which the node is a part. The given protocol architecture may include a split architecture between a central unit and a distributed unit. In addition, the given protocol architecture may define a control plane, a user plane, or other protocol layers. The given protocol architecture may also include an interface that defines a plurality of messages for use in communication between the protocol layers. The instructions 316 may be stored as computer code on the computer-readable medium. In that regard, the terms "instructions" and "programs" may be used interchangeably herein. The instructions 316 may be stored in object code format for direct processing by the one or more processors 310, or in any other computer language including scripts or collections of independent source code modules that are interpreted on demand or compiled in advance. Functions, methods and routines of the instructions 316 are explained in more detail below.

The one or more transceivers 320 may include at least one wireless transceiver mounted to actuators that can be controlled, or steered, to point in a desired direction via the one or more antennas 322. To form a wireless link between two nodes, such as the node associated with the HAP 114 and the node associated with the first terrestrial tower 110, the wireless transceivers of the respective nodes can be controlled to point in the direction of one another so that data can be sent and received between the nodes. For nodes with fiber or cable connections, such as second terrestrial tower 112, the one or more transceivers 320 may also include at least one transceiver configured to communicate via a fiber or cable connection.

As further shown in FIG. 3, the client device 152 associated with user 150 may be a personal computing device or a server with one or more processors 350, memory 352, data 354, instructions 356, one or more transceivers 358, and one or more antennas 360 similar to those described above with respect to the one or more processors 310, memory 312, data 314, instructions 316, one or more transceivers 320, and one or more antennas 322. In some examples, the one or more antennas 360 may be directional antennas configured to transmit signals from the client device 152 in different directions. The signals may be transmitted in different directions simultaneously or at different times. At least one of the signals may be a millimeter wave signal. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client device 152 may be any device capable of processing instructions and transmitting data to and from humans and other computers including general purpose computers, network computers lacking local storage capability, and set-top boxes for televisions. In some embodiments, client devices may be associated with one or more self-defined network (SDN) applications and may have one or more northbound interface (NBI) drivers.

Figure 4:
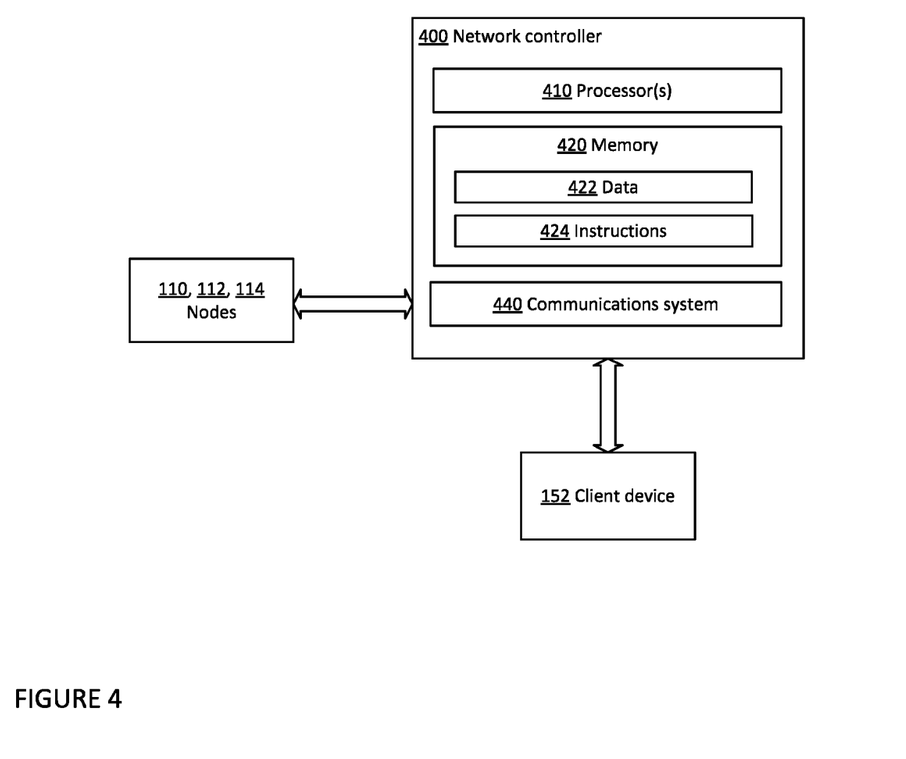
FIG. 4 is a functional diagram of a network controller in accordance with aspects of the disclosure.

In some implementations, the network can be an SDN that is controlled by an SDN controller, such as network controller 400 depicted in FIG. 4. The network controller 400 may be located at one of the network nodes or at a separate platform, such as, for example, in a datacenter. The nodes of the network, including nodes 110, 112, 114 may be configured to communicate with one another using the steerable transceivers or antennas, such as the one or more transceivers 320 or the one or more antennas 322. As the HAPs in the network, such as HAP 114, move with respect to other nodes in the network, such as terrestrial towers 110, 112, some network links may become infeasible due to range of the transceivers or obstacles between the nodes. Thus, the configuration of the network may require regular (i.e., periodic) or irregular reconfiguration using the network controller 400 to maintain connectivity and to satisfy determined network flows.

FIG. 4 is a block diagram of network controller 400. The network controller 400 may be configured to send control messages to the nodes of the network to provide reconfiguration according to updated topology, to pass routing information, and to schedule reconfigurations to transmit client data. As shown in FIG. 4, the network controller 400 may include one or more processors 410, memory, 420, and communications system 440. The one or more processors 410 may be similar to the one or more processors 310 described above. Memory 420 may store information accessible by the one or more processors 410, including data 422 and instructions 424 that may be executed by processor 410. Memory 420, data 422, and instructions 424 may be configured similarly to memory 312, data 314, and instructions 316 described above. The data 422 may include a table representing all of the available nodes and possible links in the network 100 at a given time or time frame. The instructions 424 may include one or more modules for managing topology and routing, determining topology, determining network flows, solving for network configurations, controlling flight of a given HAP, or scheduling future network configurations.

The communications system 440 may be configured to communicate with the nodes of network, such as nodes 110, 112, 114, as well as one or more client devices, such as client device 152. In some embodiments, the communication system 440 includes a Control to Data-Plane Interface (CDPI) driver configured to communicate with a CDPI agent at each of the nodes. In addition, the communications system 440 of the network controller 400 may include one or more NBI agents configured to communicate with an NBI driver at each client device associated with one or more SDN applications. The communication system 440 may optionally or alternatively be configured to transmit and receive a signal via radio frequencies, optical frequencies, optical fiber, cable, or other communication means to and from the nodes in the network and the one or more client devices.

Example Implementations and Methods

In addition to the operations described above and illustrated in the figures, various implementations and methods will now be described. It should be understood that the described operations and steps do not have to be performed in the precise order provided below. Rather, various operations and steps can be handled in a different order or simultaneously, and operations and steps may also be added or omitted.

In aspects of the technology, overlapping spectrum of two different coverage types, such as 4G LTE and 5G NR, may be dynamically scheduled between the two coverage types. In particular, 5G communications may be scheduled to use 4G LTE spectrum during periods of time when 4G LTE communications are not scheduled. Messages may be transmitted between nodes or between a node and a UE to communicate location information of nodes and/or UE, as well as spectrum or resource usage information.

Figure 5:
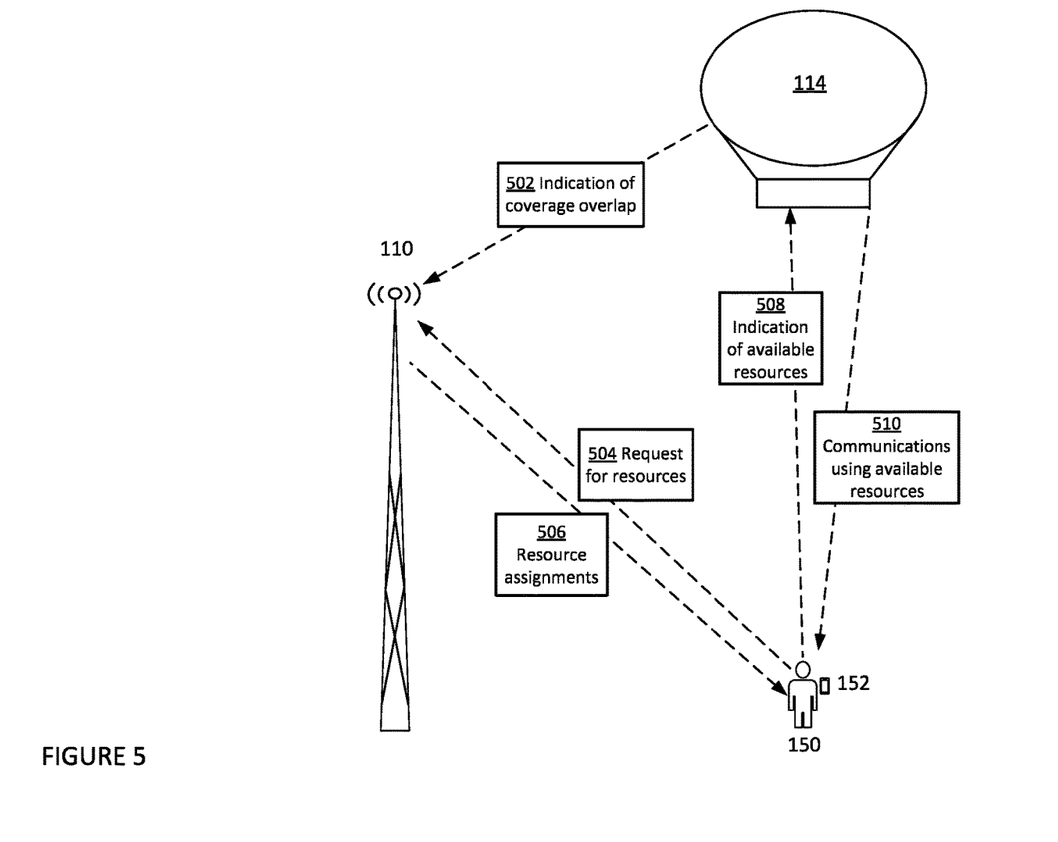
FIG. 5 is a pictorial diagram of a scenario in accordance with aspects of the disclosure.

In one scenario depicted in FIG. 5, a first node, such as a terrestrial node 110, may be configured to transmit and receive 4G LTE signals to a UE 152. A second node, such as a non-terrestrial node 114, may be configured to transmit and receive 5G signals to a UE 152. A messaging protocol or mechanism between the first node, the second node, and/or the UE may be implemented to coordinate usage of both 4G LTE and 5G signals with the UE. In other scenarios, the first node and/or the second node may be configured to transmit and receive other types of signals other than 4G LTE and 5G signals.

The messaging protocol may include the following:

(i) When the second node is a non-terrestrial node, such as a high-altitude balloon 114, a first message may be transmitted from the second node to the first node when a coverage area of the second node overlaps with a coverage area of the first node. As shown in FIG. 5, the first message 502 may include an indication of coverage overlap between the second node and the first node. The second node may detect the coverage overlap by comparing a known coverage area of the first node with a coverage area of the second node from a current location or predicted future location(s) of the second node. The coverage area of the first node and other terrestrial nodes may be stored in a memory of the second node or a remote storage system that is accessible to the one or more processors of the second node. The message may be transmitted directly from the second node to the first node or may be transmitted to another node of the network, a central server, or a network controller, then routed to the first node through the network. Alternatively, one or more processors of the central server or the network controller may track the location of the second node, determine that the coverage area of the second node overlaps with that of the first node based on the tracked location, and transmit the message to the first node and/or the second node in response to determining the coverage overlap.

(ii) The first node may receive requests for resources from one or more UE in the coverage area of the first node. The request for resources may include features, capacities, or other characteristics of a given UE. For example, a feature of the UE may be the directional antennas, which allows the given UE to utilize resources between the directional antennas with different frequency band or timing constraints than with other antennas. In some implementations, a given UE of the one or more UE may be send a request for resources for a purpose of blocking a set of resources from use with the first node. The given UE may send the request for this purpose when the given UE is also in the coverage area of the second node. As shown in FIG. 5, the UE 152 that is associated with user 150 may be in the coverage area of the terrestrial tower 110 and the high-altitude balloon 114. While in this overlap area, the UE 152 may transmit the request for resources 504. The request may be sent after the first message or prior.

(iii) The one or more processors of the first node may assign resources to each of the one or more UE based on the received requests and transmit the assignments to each UE via a second message. To assign the resources, the one or more processors of the first node may determine whether the one or more UE area also in a coverage area of another node, such as the second node, based on a location of a given UE. When the given UE is in the coverage area of the first node and the second node, the resource assignments may be determined to divide the resources between the nodes. In addition, when the given UE has the feature of directional antennas, the one or more processors may take the specific constraints or capabilities of the feature for the resource assignments. The assignments may be determined using Semi-Persistent Scheduling (SPS), or other method that assigns a periodicity to a particular assignment. In other words, a set of resources may be assigned to a particular UE for a predetermined period of time.

In some implementations, one or more artificial intelligence techniques may be used to determine the resource assignments to each of the one or more UE. For example, a neural network may be trained using machine learning techniques to receive input data related to requests for resources and to provide output data related to resource assignments that satisfy the requests. The input data may include features and capacities of a given UE, amount of resources demanded at a given node, or types of resources available. The one or more processors of the first node may be a part of the neural network, or may transmit input data to and receive output data from the neural network.

As shown in FIG. 5, the resource assignments 506 may be transmitted from the terrestrial tower 110 to the UE 152 in response to the request 504. One or more additional UE may be in the coverage area of terrestrial tower 110 at the same time as UE 152, in which case each additional UE would also receive corresponding resource assignments. In some implementations, the one or more processors of the first node may further determine that a given UE is in the coverage overlap, in which case the second message may include information related to the second node. The information may include, for example, the location of the second node, an identifier of a communication channel of the second node, etc.

(iv) A given UE of the one or more UE that is also in the coverage overlap of the first node and the second node may transmit a third message to the second node that indicates available resources. For example, the third message may identify which resources of the resources assigned to the given UE is not being used by the given UE. The unused resources identified may include a frequency range or a time frame in the period of time for the assignment. In some implementations, at least a portion of the set of resources or at least a portion of the predetermined period of time assigned to the given UE may be blocked from use with the first node. The unused resources identified in this implementation may be those that are blocked from use with the first node. Additionally or alternatively, the available resources may be determined based on characteristics of the second node, such as location, environmental conditions, distance, or types of communication systems on the second node. These characteristics may be transmitted to the given UE as part of the resource assignments 506 described above. In FIG. 5, the third message 508 transmitted from the UE 152 to the high-altitude balloon 114 may include an indication of available resources. The indication of available resources may be a frequency band that falls within the frequency band designated for communications of the balloon 114.

(v) The one or more processors of the second node may then transmit signals to the given UE based on the available resources. As shown in FIG. 5, a signal 510 from the high-altitude balloon 114 to the UE 152 may carry communications using the available resources indicated in the third message 508.

Figure 6:
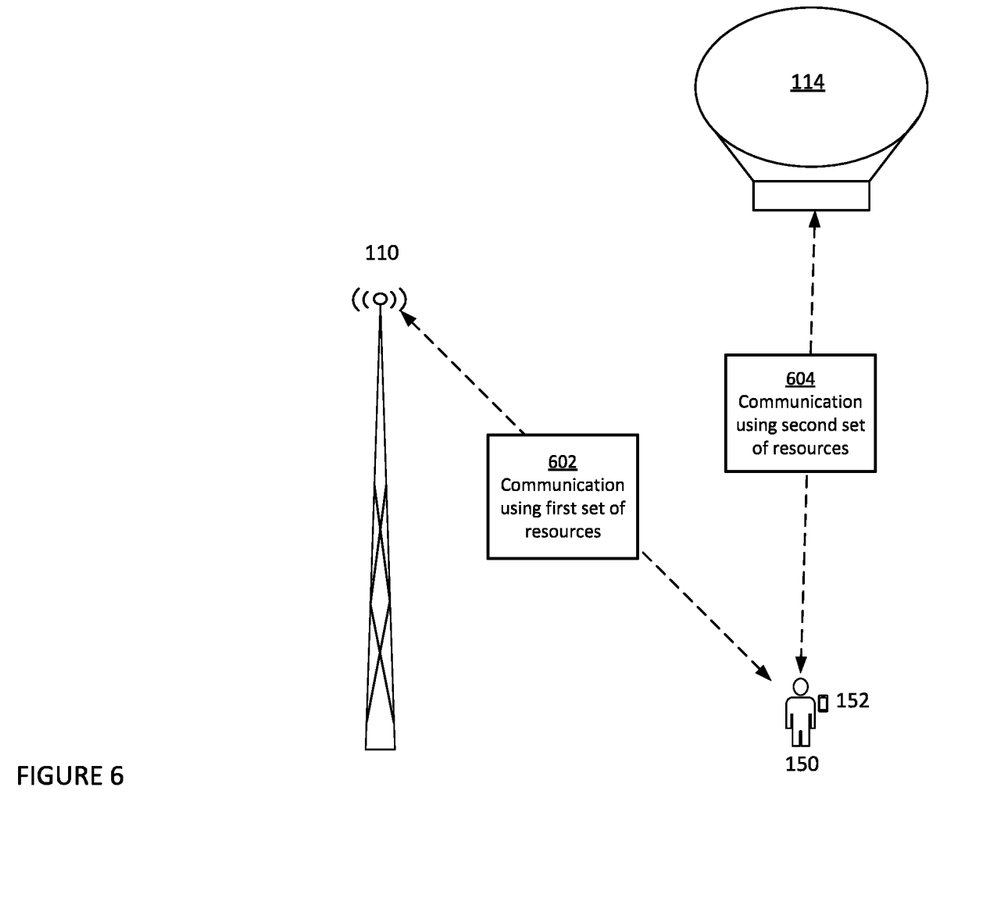
FIG. 6 is a pictorial diagram of a scenario in the network in accordance with aspects of the disclosure.

While in the overlapping coverage area of the first node and the second node, the given UE may simultaneously communicate with the first node and the second node based on the resource assignments or may switch between communicating with the first node and the second node based on the resource assignments. As shown in FIG. 6, after receiving the resource assignments 506, the UE 152 may send and receive communications 602 to the first node using a first set of resources and may send and receive communications 604 to the second node using a second set of resources. The second set of resources are set by the third message 508 to be different from the first set of resources.

Figure 7:
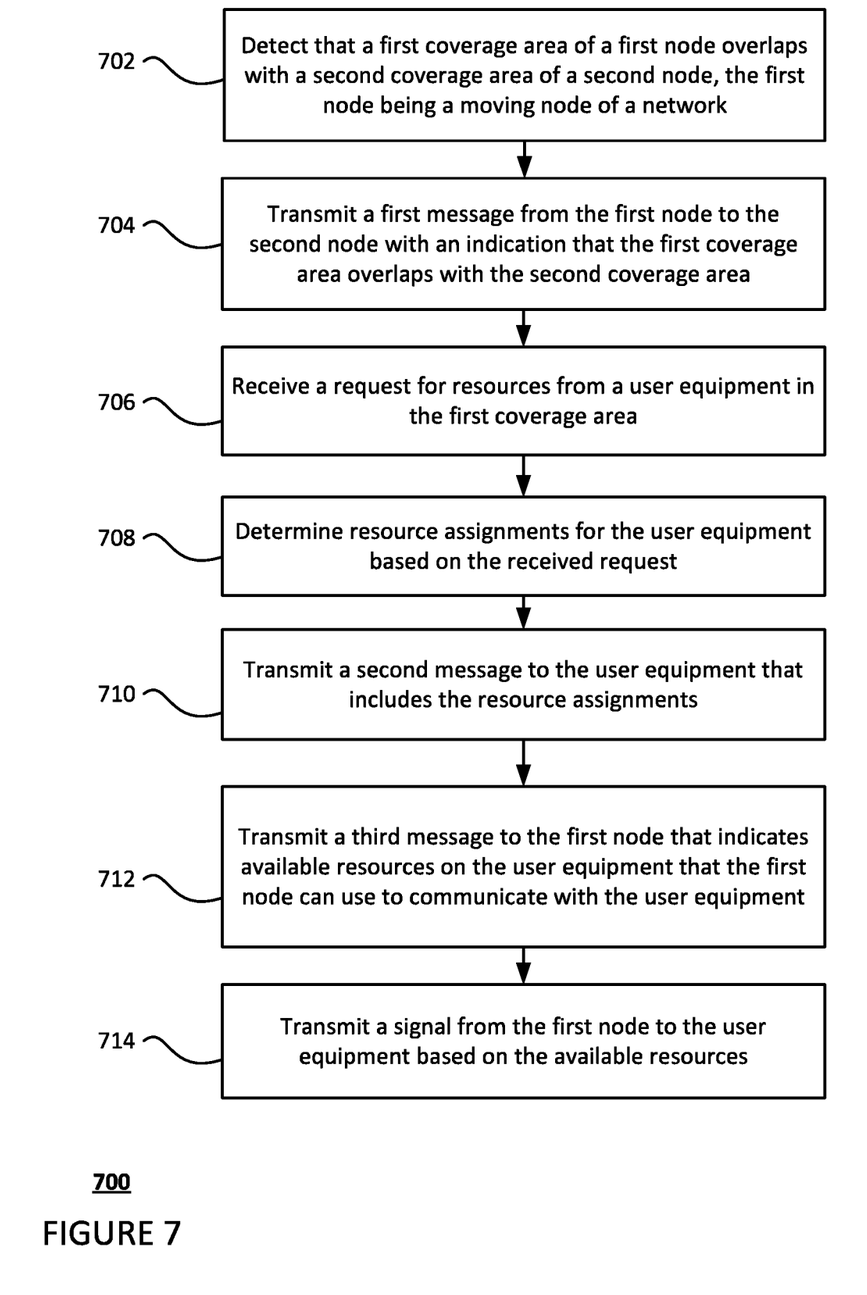
FIG. 7 is a flow diagram of an example method in accordance with aspects of the disclosure.

In FIG. 7, flow diagram 700 is shown in accordance with some of the aspects described above that may be performed by one or more processors of nodes of a network, such as that of nodes 110 or 114, or network controller 400. While FIG. 7 shows blocks in a particular order, the order may be varied and that multiple operations may be performed simultaneously. Also, operations may be added or omitted.

At block 702, it may be detected that a first coverage area of a first node overlaps with a second coverage area of a second node. The first node may be a moving node of a network, such as a high-altitude balloon 114, and the second node may be a non-moving node of the network, such as a terrestrial tower 110. The detection may be based on a trajectory of the first node towards the second node. At block 704, a first message may be transmitted from the first node to the second node with an indication that the first coverage area overlaps with the second coverage area. At block 706, request for resources from a user equipment in the first coverage area may be received at the first node. At block 708, resource assignments may be determined for the user equipment based on the received request. The resource assignments include a first resource assignment for communication between the user equipment and the first node and a second resource assignment for communication between the user equipment and the second node. The first resource assignment may be a first frequency band or a first time frame in a period, and the second resource assignment may be a second frequency band different from the first frequency band or a second time frame in the period different from the first time frame. At block 710, a second message may be transmitted to the user equipment that includes the resource assignments. The user equipment may use the resource assignments to communicate with the first nodes and the second nodes. At block 712, a third message may be transmitted to the first node that indicates available resources on the user equipment that the first node can use to communicate with the user equipment. The available resources may be some or all of the resources in the first resource assignment. In one example, the third message is transmitted from the user equipment. At block 714, a signal may be transmitted from the first node to the user equipment based on the available resources.

In some alternative examples of this implementation, a central server or network controller receives the request for resources from the one or more UE and assigns resources for communications with the first node and/or the second node for each UE. The one or more processors of the central server or network controller then transmits the assignments to each UE of the one or more UE, the first node, and/or the second node.

Figure 8:
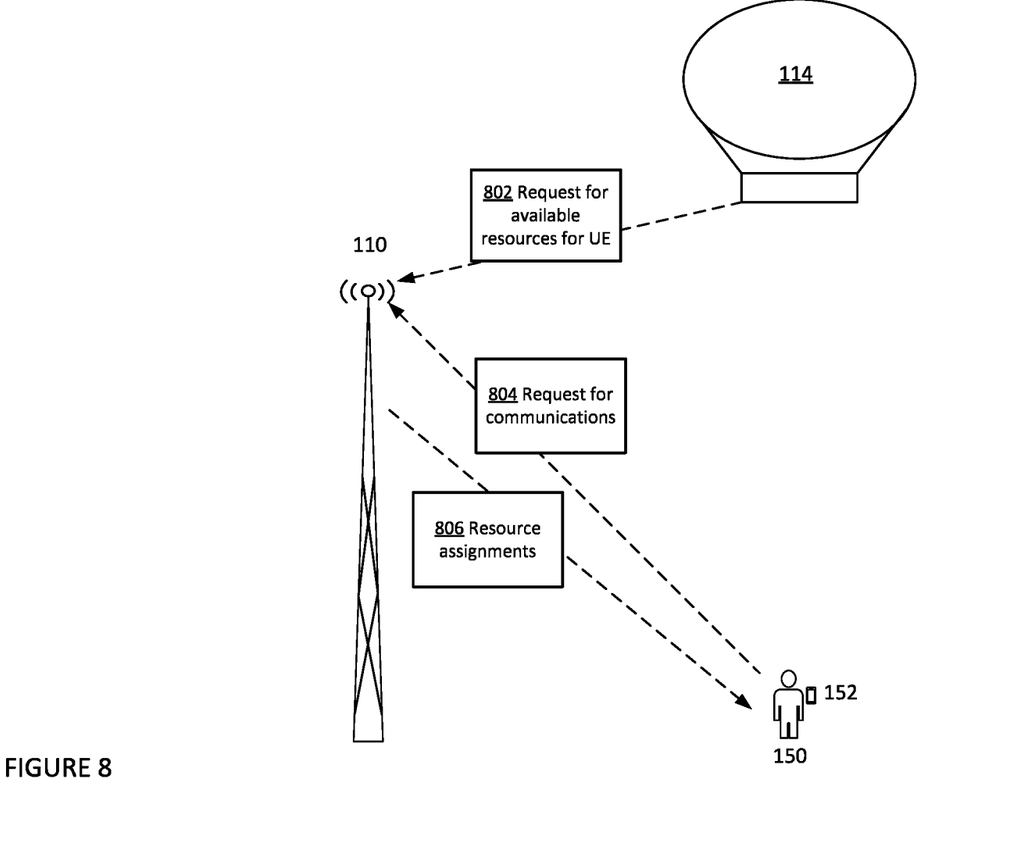
FIG. 8 is a pictorial diagram of a scenario in the network in accordance with aspects of the disclosure.

In another implementation, the mechanism may not utilize SPS, but rather include cooperation between the first node and the second node by doing the following:

(i) The one or more processors of the second node may transmit a request directly to the first node regarding available resources for communication with the given UE. The first node may be a terrestrial node, such as an LTE base station, and the second node may be a non-terrestrial node. The request may be similar to a "buffer status report" that UE send to their respective base stations. In some examples, the request may also include information regarding resources of the second node over time. The request may be sent after the one or more processors of the second node determines that the given UE is in the overlapping coverage area of the first node and the second node. As shown in FIG. 8, high-altitude balloon 114 may transmit a request 802 for available resources for user equipment 152 when the user equipment 152 is in the coverage area of high-altitude balloon 114 and the terrestrial tower 110.

(ii) The first node may receive the request from the second node for communications between the given UE and the second node, as well as the request from the given UE for communications between the given UE and the first node. The one or more processors of the first node may then assign resources for both the communications between the given UE and the second node and the communications between the given UE and the first node. The resources may be determined based on available resources at the first node and second node in a given time frame. In some implementations, one or more artificial intelligence techniques may be used to determine the resource assignments to each of the one or more UE in a same or similar manner as described above.

As shown in FIG. 8, the user equipment 152 may transmit a request 804 for communications with the terrestrial tower 110 and/or the high-altitude balloon 114. The request 804 may be received at the terrestrial tower 110 after the request 802, or vice versa. The one or more processors of terrestrial tower 110 may then determine resource assignments for the user equipment based on known available resources at the terrestrial tower 110 and available resources at the high-altitude balloon 114. The available resources at the high-altitude balloon 114 may be included in the request 802 or received in a subsequent communication from the high-altitude balloon 114.

(iii) An indication of the resource assignments for the communications between the given UE and the second node may be transmitted from the first node to the second node. As shown in FIG. 8, resource assignments 806 may be transmitted from the terrestrial tower 110 to the user equipment 152, similar to the resources assignments 506 described above.

(iv) The second node may then use the assigned resources to transmit signals to the given UE, similar to the example shown and described in FIG. 6.

In a further implementation, the messaging protocol may be further simplified by treating the second node as a UE.

For example, a computing device on the second node may be configured to behave as a UE. The protocol may include:

(i) The computing device on the second node may transmit a request to the first node for resources. Notably, when the first node is a terrestrial node and the second node is a non-terrestrial node, the computing device on the second node may require a high antenna gain in order to transmit the request to the first node, since the first node may not be equipped to detect UE that are not on the ground. In some examples, the computing device may transmit the request to the first node after the one or more processors of the second node determines that the second node is within a particular distance of the first node for the transmission to reach the first node. For example, in FIG. 9, a request 902 for resources may be transmitted from the high-altitude balloon 114 to the terrestrial tower 110. This request 902 may be similar to the request 504 described above.

Figure 9:
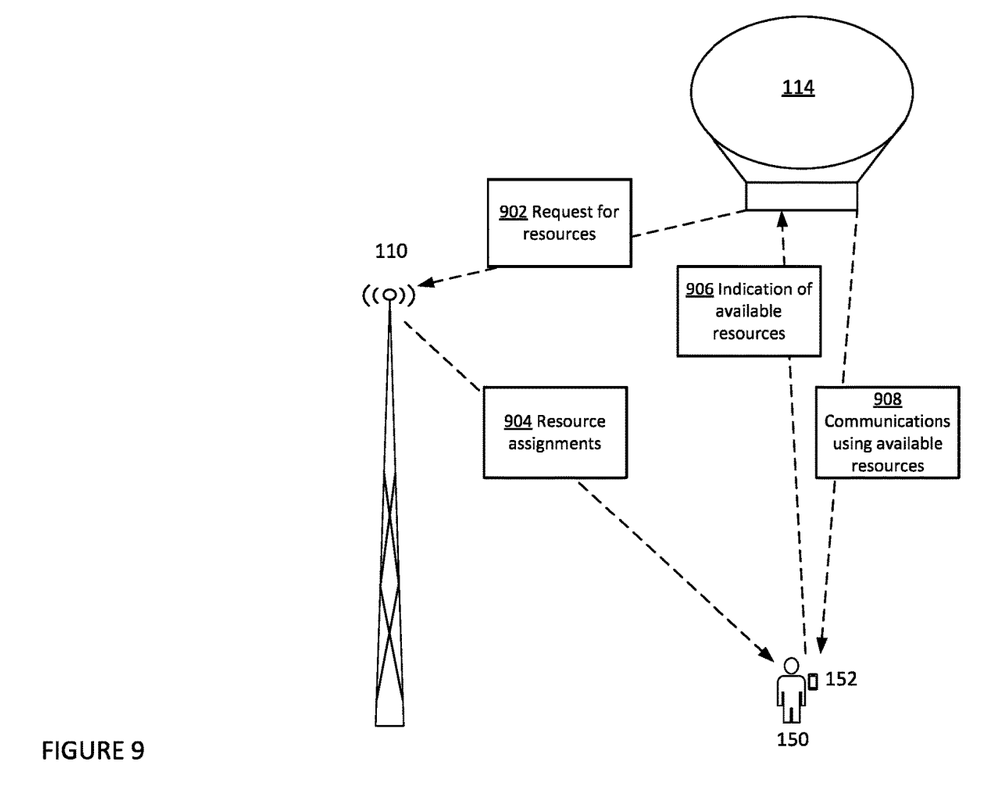
FIG. 9 is a pictorial diagram of a scenario in the network in accordance with aspects of the disclosure.

(ii) Because the computing device on the second node is recognized as a UE, the first node may therefore treat the received request as a typical "buffer status report" from a UE and assign resources in a same manner as assigning resources to one or more UE in its coverage area. For example, the terrestrial tower 110 may determine the resource assignment for the high-altitude balloon 114 as if the high-altitude balloon 114 is a UE in the coverage area of the terrestrial tower 110, similar to block 708.

(iii) The first node may transmit the resource assignment to the UE. As shown in FIG. 9, the resource assignments 904 are transmitted from the terrestrial tower 110 to the user equipment 152 after receiving the request for resources from the high-altitude balloon 114. The resource assignments transmitted to the UE may also include resources assigned for communications between the first node and the UE. Transmission of the resource assignments 904 may be similar to the transmission of resource assignments 506 described above.

(iv) After obtaining the assigned resources from the UE, the second node may use the assigned resources to transmit signals to a given UE in a coverage area of the coverage overlap. For example, the user equipment 152 may determine available resources for communication with the high-altitude balloon 114 based on the resource assignments 904. A message 906 carrying an indication of available resources may be transmitted from the user equipment 152 to the high-altitude balloon 114 when the user equipment 152 is in the coverage area of the high-altitude balloon. This message may be similar to the message 508 described above. The high-altitude balloon 114 may then transmit signals carrying communications 908 using available resources to user equipment 152. These signals may be similar to signal 510 described above.

Alternatively, the resource assignments may be transmitted to the second node, which redirects it to the UE. The UE may then communicate with the second node using the resource assignments received from the second node.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of assigning resources for transmitting signals to a user equipment, the method comprising:
   receiving, by one or more processors of a first node having a first coverage area, a first message from a second node when the second node is a non-terrestrial node having a second coverage area that overlaps with the first coverage area, the first message including an indication of an overlapping coverage area;
   receiving, by the one or more processors, requests for resources from a user equipment in the first coverage area;
   determining, by the one or more processors, resource assignments to the user equipment based on the first message and the received request, the resource assignments including a first resource assignment for communication with the first node and a second resource assignment for communication with the second node; and
   transmitting, by the one or more processors, the resource assignments to the user equipment in a second message to cause the user equipment to communicate with the first node using the first resource assignment and to communication with the second node using the second resource assignment.

2. The method of claim 1, wherein the requests for resources from the user equipment includes a request to block a set of resources from use with the first node.

3. The method of claim 1, wherein the determining of the resource assignments includes determining that the user equipment is in the first coverage area of the first node and the second coverage area of the second node.

4. The method of claim 1, wherein the determining of the resource assignments includes using Semi-Persistent Scheduling.

5. The method of claim 1, wherein the first resource assignment is a first frequency band, and the second resource assignment is a second frequency band different from the first frequency band.

6. The method of claim 1, wherein the first resource assignment is a first time frame in a period, and the second resource assignment is a second time frame in the period different from the first time frame.

7. The method of claim 1, further comprising sending, by the one or more processors, one or more signals based on the first resource assignment.

8. A system for assigning resources for transmitting signals to a user equipment, the system comprising:
- one or more transceivers; and
- one or more processors of a first node in communication with the one or more transceivers, the one or more processors being configured to:
  - receive, using the one or more transceivers, a first message from a second node when the second node is a non-terrestrial node having a second coverage area that overlaps with a first coverage area of the first node, the first message including an indication of an overlapping coverage area;
  - receive, using the one or more transceivers, requests for resources from a user equipment in the first coverage area;
  - determine resource assignments to the user equipment based on the first message and the received request, the resource assignments including a first resource assignment for communication with the first node and a second resource assignment for communication with the second node; and
  - transmit, using the one or more transceivers, the resource assignments to the user equipment in a second message to cause the user equipment to communicate with the first node using the first resource assignment and to communication with the second node using the second resource assignment.

9. The system of claim 8, wherein the requests for resources from the user equipment includes a request to block a set of resources from use with the first node.

10. The system of claim 8, wherein the one or more processors are configured to determine the resource assignments based on whether the user equipment is in the first coverage area of the first node and the second coverage area of the second node.

11. The system of claim 8, wherein the one or more processors are configured to determine of the resource assignments using Semi-Persistent Scheduling.

12. The system of claim 8, wherein the first resource assignment is a first frequency band, and the second resource assignment is a second frequency band different from the first frequency band.

13. The system of claim 8, wherein the first resource assignment is a first time frame in a period, and the second resource assignment is a second time frame in the period different from the first time frame.

14. The system of claim 8, wherein the one or more processors are further configured to send, using the one or more transceivers, one or more signals based on the first resource assignment.

15. The system of claim 8, further comprising a terrestrial tower.

16. A non-transitory, computer-readable medium including instructions that, when executed by one or more processors, cause the one or more processors to perform a method, the method comprising:
- receiving, at a first node having a first coverage area, a first message from a second node when the second node is a non-terrestrial node having a second coverage area that overlaps with the first coverage area, the first message including an indication of an overlapping coverage area;
- receiving requests for resources from a user equipment in the first coverage area;
- determining resource assignments to the user equipment based on the first message and the received request, the resource assignments including a first resource assignment for communication with the first node and a second resource assignment for communication with the second node; and
- transmitting the resource assignments to the user equipment in a second message to cause the user equipment to communicate with the first node using the first resource assignment and to communication with the second node using the second resource assignment.

17. The medium of claim 16, wherein the requests for resources from the user equipment includes a request to block a set of resources from use with the first node.

18. The medium of claim 16, wherein the determining of the resource assignments includes determining that the user equipment is in the first coverage area of the first node and the second coverage area of the second node.

19. The medium of claim 16, wherein the first resource assignment is a first frequency band, and the second resource assignment is a second frequency band different from the first frequency band.

20. The medium of claim 16, wherein the first resource assignment is a first time frame in a period, and the second resource assignment is a second time frame in the period different from the first time frame.

* * * * *